(12) United States Patent
Sutton

(10) Patent No.: US 10,233,925 B2
(45) Date of Patent: Mar. 19, 2019

(54) SCALABLE HYDRAULIC MOTOR WITH DRIVE INPUT SHAFT AND DRIVEN OUTPUT SHAFT

(71) Applicant: James D. Sutton, Howell, MI (US)

(72) Inventor: James D. Sutton, Howell, MI (US)

(*) Notice: Subject to any disclaimer, the term of this patent is extended or adjusted under 35 U.S.C. 154(b) by 164 days.

(21) Appl. No.: 15/477,746

(22) Filed: Apr. 3, 2017

(65) Prior Publication Data

US 2017/0370360 A1   Dec. 28, 2017

Related U.S. Application Data

(60) Provisional application No. 62/353,849, filed on Jun. 23, 2016.

(51) Int. Cl.
| | | |
|---|---|---|
| *F16D 31/02* | (2006.01) | |
| *F04C 11/00* | (2006.01) | |
| *F04C 2/344* | (2006.01) | |
| *F04C 15/06* | (2006.01) | |
| *F16H 61/444* | (2010.01) | |
| *F16H 39/24* | (2006.01) | |
| *F16H 39/32* | (2006.01) | |

(Continued)

(52) U.S. Cl.
CPC ............ *F04C 11/001* (2013.01); *F03C 2/304* (2013.01); *F04C 2/344* (2013.01); *F04C 2/3441* (2013.01); *F04C 11/003* (2013.01); *F04C 14/065* (2013.01); *F04C 15/064* (2013.01); *F16H 39/24* (2013.01); *F16H 39/32* (2013.01); *F16H 61/444* (2013.01)

(58) Field of Classification Search
CPC .......... F16H 39/02; F16H 39/24; F16H 39/32; F16H 61/444
See application file for complete search history.

(56) References Cited

U.S. PATENT DOCUMENTS

| 3,326,087 A | 6/1967 | Gohlke et al. |
| 3,374,693 A | 3/1968 | de Coye de Castelet |
| | (Continued) | |

FOREIGN PATENT DOCUMENTS

| GB | 2436644 A | 10/2007 |
| JP | 2002005007 A | 1/2002 |
| | (Continued) | |

*Primary Examiner* — Michael Leslie
(74) *Attorney, Agent, or Firm* — Dinsmore & Shohl LLP

(57) ABSTRACT

The present invention discloses a hydraulic style motor having a first power input housing containing a first plurality of rotary or centrifugally driven pumps and associated valves, such that the pumps are driven in a determined stacked fashion by a powered input (or drive) shaft. A second power output housing contains at least one second rotary driven pump and associated valve, the second pumps rotatably engaging a second output (driven) shaft. A pressure resistant fluid line interconnects a manifold associated with the first housing with another manifold associated with the second housing so that the pressurized fluid generated by rotation of the input pumps in the input housing is communicated to the output housing to drive the output pumps to rotate the output (driven) shaft. A return line communicates with the output housing manifold, via each of the individual pump and valve subassemblies, for redirecting flow back to an input feed to the input housing.

20 Claims, 6 Drawing Sheets

(51) Int. Cl.
  *F03C 2/30* (2006.01)
  *F04C 14/06* (2006.01)

(56) References Cited

U.S. PATENT DOCUMENTS

| | | | |
|---|---|---|---|
| 3,448,578 A | 6/1969 | Bojas | |
| 3,452,680 A | 7/1969 | White | |
| 3,687,504 A | 8/1972 | Riordan | |
| 3,828,555 A | 8/1974 | Capdevielle | |
| 3,927,528 A | 12/1975 | dan der Kolk et al. | |
| 5,057,724 A | 10/1991 | Patton | |
| 5,203,172 A | 4/1993 | Simpson et al. | |
| 5,351,893 A | 10/1994 | Young | |
| 5,394,771 A | 3/1995 | Schroder | |
| 8,511,079 B2 * | 8/2013 | Stoltz | F16H 61/444 60/398 |
| 8,584,452 B2 * | 11/2013 | Lloyd | F16H 61/444 60/493 |
| 2013/0341934 A1 | 12/2013 | Kawanishi | |
| 2014/0141933 A1 | 5/2014 | Pette et al. | |

FOREIGN PATENT DOCUMENTS

| | | |
|---|---|---|
| WO | 2009124461 A1 | 10/2009 |
| WO | 2014081840 A1 | 5/2014 |
| WO | 2015193799 A1 | 12/2015 |

* cited by examiner

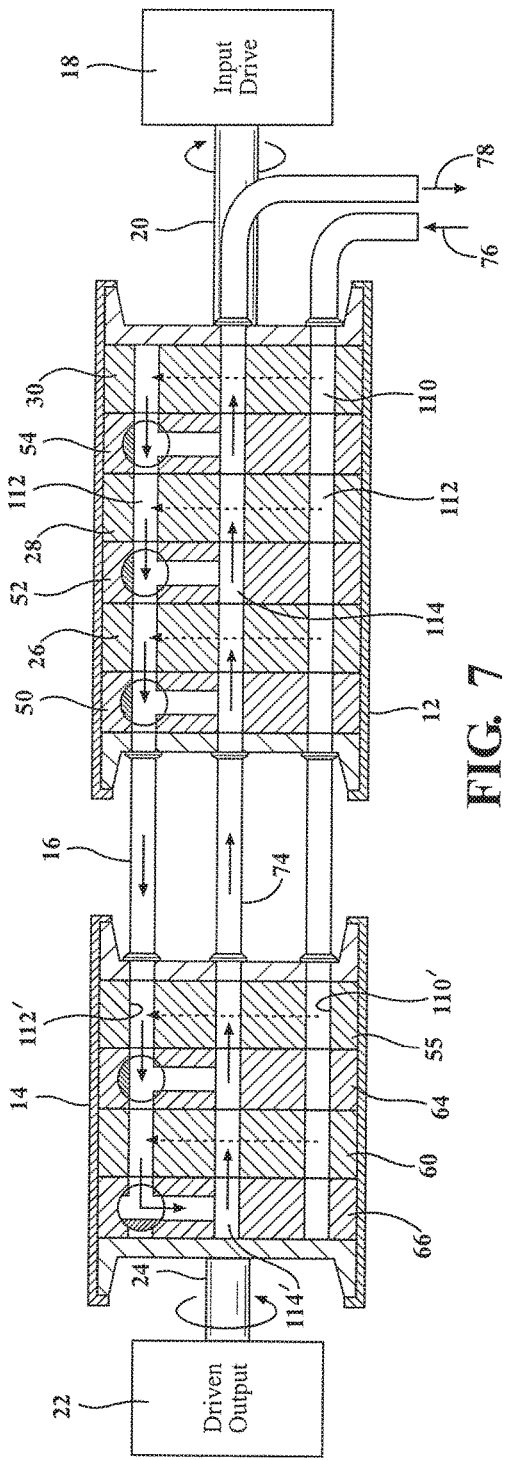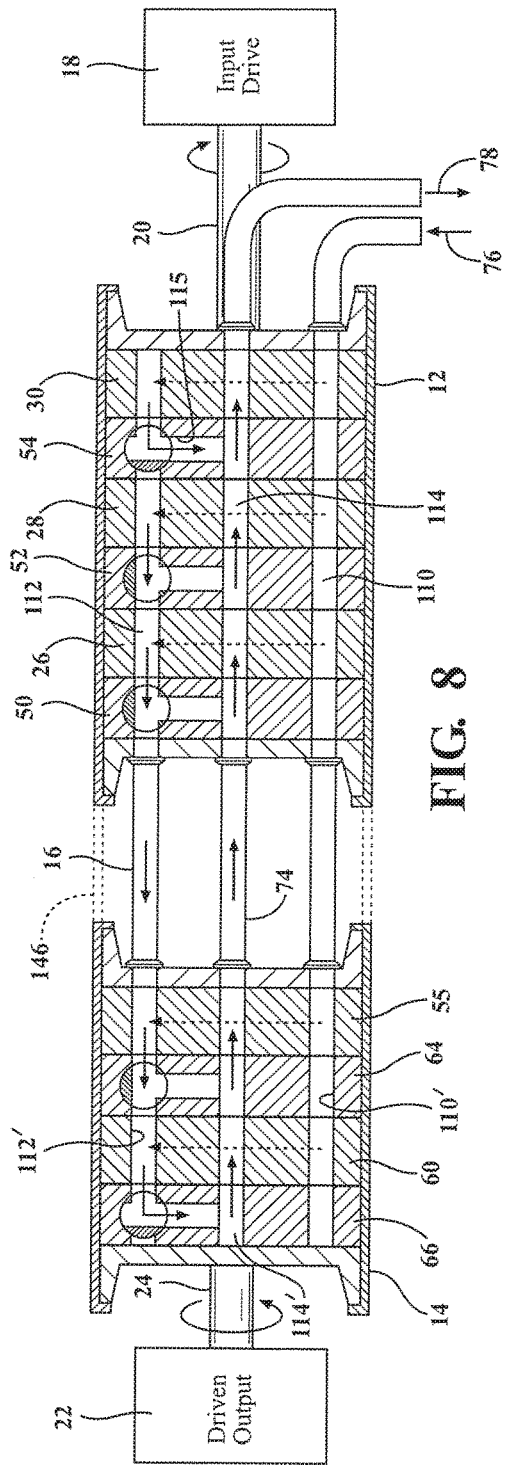

SCALABLE HYDRAULIC MOTOR WITH DRIVE INPUT SHAFT AND DRIVEN OUTPUT SHAFT

CROSS-REFERENCE TO RELATED APPLICATIONS

This application claims the benefit of U.S. Provisional Application 62/353,849 filed on Jun. 23, 2016, the contents of which are incorporated herein in its entirety.

FIELD OF THE INVENTION

The present invention relates generally to a hydraulic style motor including both rotary drive input and driven output components. More particularly, the present invention teaches a motor with a first rotary (work) input for concurrently driving any plurality of rotary driven pump and valve arrangement (typically driving vane style blades) which are contained within a fluid holding housing or body.

A series of valves and associated solenoids can be selectively or concurrently actuated to exhaust a pressurized fluid flow through a pressure hydraulic line for in turn driving a similar secondary power output work arrangement including another sub-plurality (which can include any one or more) of pumps and spool valves associated with a second housing. The invention contemplates the input (drive) and output (driven) housings to be either separate and attached by fluid pressure delivery and fluid return lines. Alternatively, the input and output side components can be integrated into a common housing.

In either variant, the rotary power drive input results in the pumps rotating in order to create a hydraulic generated flow. Associated solenoids switch any number of the pumps integrated into the input side housing, such being scaled to determine a given output flow (at any pressure) through the pressure hydraulic line extending to the driven output housing. By virtue of any stacking, ganging or other scaling relationship established by the number of pumps incorporated into either or both of the input and output housings, the scalability aspect of the present invention is intended to deliver a rotary work output through the second housing.

The term "input" and "output" can also be reversed owing to the bi-directional capabilities of the respective first and second housings of the motor. As such, the present invention further contemplates the drive output being reversed to function as a power input, with the power input thence becoming the drive output.

BACKGROUND OF THE INVENTION

The prior art is well documented with examples of positive displacement flow devices. One example of this is described in U.S. Pat. No. 6,666,666, to Gilbert et al., which teaches a pump including multiple, axially stacked positive displacement fluid device sections, such as circumferential piston pumps having chambers and contra-rotating chambers. As indicated, the device can be similarly employed as a fluid motor.

The stacked sections are arranged within an outer retaining barrel in one or more stages. The pump is particularly suitable for installation downhole in the casing of a wellbore. As further described, each section includes a pair of rotors fit to shafts which are rotatably supported on hard faced bearings between the shafts and the bosses. Each pump section draws fluid from an inlet port and discharges fluid to a common and contiguous discharge manifold. The inlets of the pump sections for a suction stage communicate with a fluid source. Cross-over sections route fluid between stages. Successive pressure stages draw fluid from the cross-over fit to the preceding stage's discharge manifold.

Other references of note include the power plant for self-propelled vehicles of Capdevielle, U.S. Pat. No. 3,828,555, which two pipelines are inserted between a high-pressure tank and a low-pressure tank containing a hydraulic fluid. A hydraulic motor is inserted in the first pipe line and is adapted to actuate the driving shaft of the vehicle through a freewheel coupling. A motor-pump unit is inserted in the other pipe line. This motor-pump unit has a relatively low-rated power output and is continuously operating at the same speed, such that the design is described as being particularly suited to automotive applications intended for service requiring frequent stops.

WO 2009/124461, to Xiang, teaches a hydraulic power engine and generator group apparatus including each of a first part in the form of an energy conversion magnifying power region, a second part speed adjustable direct current motor connected in series with accumulators, a third part reduction gear box and a fourth part hydraulic system with hydraulic cylinders.

Pette, US 2014/0141933, teaches a drive system and method including a gearbox system, a first hydraulic motor driving a first input shaft, a second hydraulic motor driving a second input shaft, a drive pump driving the first and second hydraulic motors, and a system control for controlling the drive pump, the clutch assembly, and the first and second hydraulic motors. The gearbox system includes the first input shaft having a first input gear driving a first output gear on an output shaft, the second input shaft having a second input gear driving a second output gear disengageable from the output shaft, and a clutch assembly for engaging the second output gear with the output shaft. The clutch assembly includes a clutch to engage the second output gear with the output shaft, and a fluid access channel through a rotary manifold to provide pressurized fluid to activate the clutch.

SUMMARY OF THE INVENTION

The present invention discloses a hydraulic style motor having a first power input housing containing a first plurality of rotary or centrifugally driven pumps and associated valves, the pumps being rotatatably or centrifugally driven in a pre-determined stacked fashion, such as dictated by the position of each valves for activating or deactivating a selected pump, and via a powered input (or drive) shaft. A second power output housing contains at least one second rotary driven pump and associated valve, the second pumps rotatably engaging a second output (driven) shaft.

A pressure resistant fluid line interconnects a manifold associated with the first housing with another manifold associated with the second housing so that the pressurized fluid generated by the input shaft driving rotation of the input pumps in the input housing is communicated to the output housing and to drive the output pumps in a likewise fashion and to rotated the output (driven) shaft. A return line communicates with the output housing manifold, via each of the individual pump and valve subassemblies, for redirecting flow back to an input feed to the input housing. Depending upon the application and environment in which the motor assembly is situated, a filter and/or collection reservoir can be located within the return line.

The valves associated with each pump body can include without limitation any of rotary or spool valves. Electromagnetic actuated solenoids can also be employed for actuating the valves associated with each individual pump incorporated into each of the input and output housings.

The individual pumps are each keyed to rotated with the shaft (driving input or driven output) to which it is engaged and, via the associated valve, can be selectively activated or deactivated on either of the input or output side housings. In this fashion, the first and second housings are scalable in order to vary a volumetric ratio between said first and second pluralities of rotary driven pumps.

Additional features includes providing, in one variant, the input and output housings as separate bodies. It is also envisioned that the first and second housings being integrated into a unitary body.

BRIEF DESCRIPTION OF THE DRAWINGS

Reference will now be made to the attached drawings, when read in combination with the following detailed description, wherein like reference numerals refer to like parts throughout the several views, and in which:

FIG. 7 is a horizontal cutaway of a hydraulic motor according to one operating arrangement illustrating the collection and distribution manifold associated with each of the input and output side housings, the valves associated with each input or output side pump either selectively activating the pump or deactivating the pump by venting fluid flow to the central neutral/return line; and FIG. 8 is a similar illustration to FIG. 7 and depicting a selected input side pump being deactivated in order to convert the 3:2 stacked arrangement input to output operating pumps in FIG. 7 to a 2:2 arrangement.

DETAILED DESCRIPTION OF THE PREFERRED EMBODIMENTS

Figure 1:
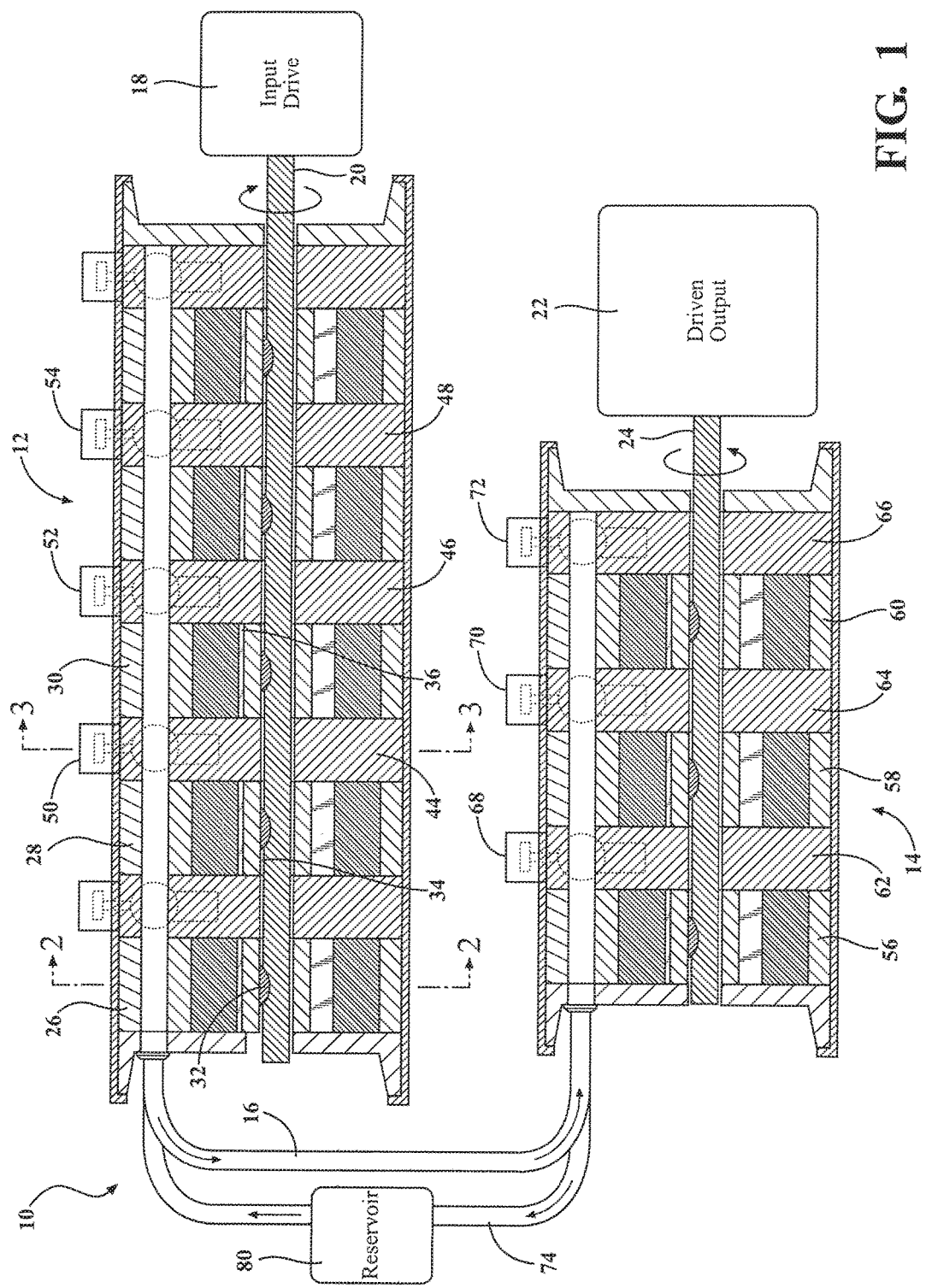
FIG. 1 is a vertical cutaway illustration of a hydraulic motor according to one non-limiting embodiment of the present invention and which depicts input and output housings, each including a stacked plurality of rotary or centrifugally driven pumps and (check, rotary or spool) valves, along with pressurized feed and return lines extending from manifolds associated with each of the input and output housings.

With reference now to FIG. 1, the present invention discloses a scalable hydraulic motor, generally illustrated in cutaway at 10 and according to one embodiment of the present invention. In the illustrated embodiment, the hydraulic style motor including both rotary input, see housing 12, and rotary output, see housing 14, components, these being interconnected by a suitable fluid pressure rated hose 16 or similar conduit. As will be further described, the present invention contemplates the ability to vary a volumetric capacity of each housing, according to a desired ratio, in order to provide a desired output through combining any number of pumps on either or both the input and output sides, the volume ratio of input to drive being determined by the number of pumps employed.

Without limitation, and as will be further described, the present invention also envisions the input and output components to be either integrated into a single unitary housing (further such as in which the input and output shafts are configured on opposite sides of such a housing) or reconfigured in some other fashion, this in order to provide a first rotary work input "x" which results in a second rotary output "y", and in theory in which y>x based upon the collective pressurized fluid generated by the centrifugal driving pumps in the input side housing which feed pressurized driving fluid to the scaled plurality of additional pumps located in the output side housing. As further shown, the rotary input "x" is represented by power unit 18, such as which can include any of an internal combustion engine, an AC induction motor, a windmill or other external rotary power input source which is connected to the input housing via an input shaft 20 exhibiting spatially arrayed and splined interior locations associated with the first housing 12 interior.

For purposes of the present invention, the term "shaft" as referenced herein in regards to the input and output drives of the various housings is further understood to encompass and include any type of input and output drive in the form of an elongated and rotary driven linkage (again not limited to an elongated and splined/spliced interface) for slaving the pumps together in order to be either concurrently driven on the input side or to concurrently drive on the output side. Accordingly, the term shaft as used will cover any such elongated linkage accomplishes these objectives.

Additionally, it is understood that the input 12 and output 14 housings can also encompass and be interpreted to cover a stacked arrangement of pumps/valves which are not contained within any unitary enclosure. In one instance, this can also include the stacked or grouping plurality of the individual pump bodies self defines each of the input and output side enclosures or housings.

As is also shown, the second output housing 14 likewise exhibits drive output "y" referenced at 22 and supplied by the an output shaft 24. Without limitation, the drive output 22 can be represented by any of a direct rotary work output shaft (such as associated with a turbine or the like) or can be integrated into an electro generator assembly for creating electricity. For clarification, it is further noted that the present invention does not operate under the premise of any type of perpetual motion, given that the driving of the input shaft (via input drive 18) and the driven aspect of the output shaft operate (via driven output 22) are separate power/ powered sources which can operate at an efficiency (or inefficiency).

The first input side housing 12 illustrates a plurality of individual rotary driven pump bodies, several of which are shown and which are illustrated at 26, 28, 30, et seq. An interior mounting annulus of each pump may exhibit a keyed configuration (see at 32, 34, 36, et seq. in FIG. 1) so that it is mounted to spline locations (see as shown at 38, 40, 42, et seq. in exploded FIG. 6) of the internally extending shaft 20 and, in this fashion, are caused to rotate in unison with the rotation of each of the input housing driving shaft 20 as well as output housing driven shaft 24.

The housing is filled with a substantially non-compressible fluid, such as water or a like glycol based solution, which is more resistant to freezing at colder temperatures and/or vaporizing at elevated temperatures. As will be described in further detail with reference to additional FIGS. 2-8, rotation of the individual pump bodies causes centrifugally driven fluid flow patterns, to be engendered within the fluid filled interior of the first housing 12.

A plurality of valves are incorporated into each pump body and are further generally referenced at 44, 46, 48, et seq. Without limitation, the present invention also contemplates the use of any fluid influencing (defined as moving or driving through any of linear, centrifugal or other motion) element or profile, such not limited to any other type of vane or even of a fluid driving impeller or propeller like blade, these further capable of being stacked, scaled or interconnected in any fashion which provides for the varying of the volumetric capability of the first and second (such being bi-directionally capable input/or output side housings).

A like plurality of solenoids, see further at 50, 52, 54, et seq., are associated with each valve (see again at 44, 46, 48, et. seq., in FIG. 1). As will be further described, the solenoids are capable of being selectively or concurrently actuated to communicate the individually engendered fluid patterns into a common manifold associated with an outer periphery of the housing 12.

The solenoids, as is understood, can include such as wrapped magnetic coils through which a current is supplied (from an external electrical power source not shown) and in order to vary the intensity of a generated magnetic field. In this manner, the individual valves 44, 46, 48, et seq., are opened or closed to the common manifold associated with each of the input housing to vary the amount of fluid being forced therethrough and into the second output side housing 14.

As will be described in further detail, the second housing 14 is constructed substantially identical to the first housing 12 and includes a plurality of rotary driven pump bodies, depicted at 56, 58, 60, et seq., incorporated into a fluid filled interior and communicated to a common manifold associated with the second housing 14 which is communicated to a second outlet end of the high pressure hose/conduit 16. A similar arrangement of valves 62, 64, 66, et seq. and solenoids 68, 70, 72, et seq. are further configured on the outlet side and which, in a reverse arrangement to that associated with the first input side housing 12, are selectively or concurrently activated in a similar fashion in order to vary the rotary drive output 24 as a factor of the number of solenoid activated rotary pump bodies on the input housing side.

As is further described, the associated solenoids switch any number of the pumps (such as again which can be stacked, scaled, tiered or arranged in any plural driving fashion for each of the first and second housing or subportions of a single housing incorporating both input and output capabilities) and in order to determine a given output flow through the high pressure hydraulic line 16. By virtue of a stacking or ganging relationship established between the input and output housings, the scalability aspect of the present invention is intended to deliver an increased rotary work output through the second housing which exceeds a given work input on the input side.

Although not shown, it is further understood that a closed variant of the system (such as integrated into a vehicular or other portable/mobile application) can include a return fluid line (shown at 74 in FIG. 1) for redirecting fluid from the second output housing 14 back to the input side 12. This can further include another fluid line (not shown) operating via a pump or even by Ventura effect in order to redirect fluid back to the input side housing under desired fluidic conditions.

An open system is also contemplated, such as for fixed or static installations, and in which a continuous reservoir of fluid is drawn from on the input housing side (again via a separate fluid feed line as shown at 76 in FIG. 7), with a separate sink line extending from the output side housing 14 (as further shown at 78). Alternatively, a closed circulation system can includes a reservoir 80 (FIG. 1) which is located in the return line 74 from the output housing 14 common manifold back to the inlet housing 12.

Figure 2:
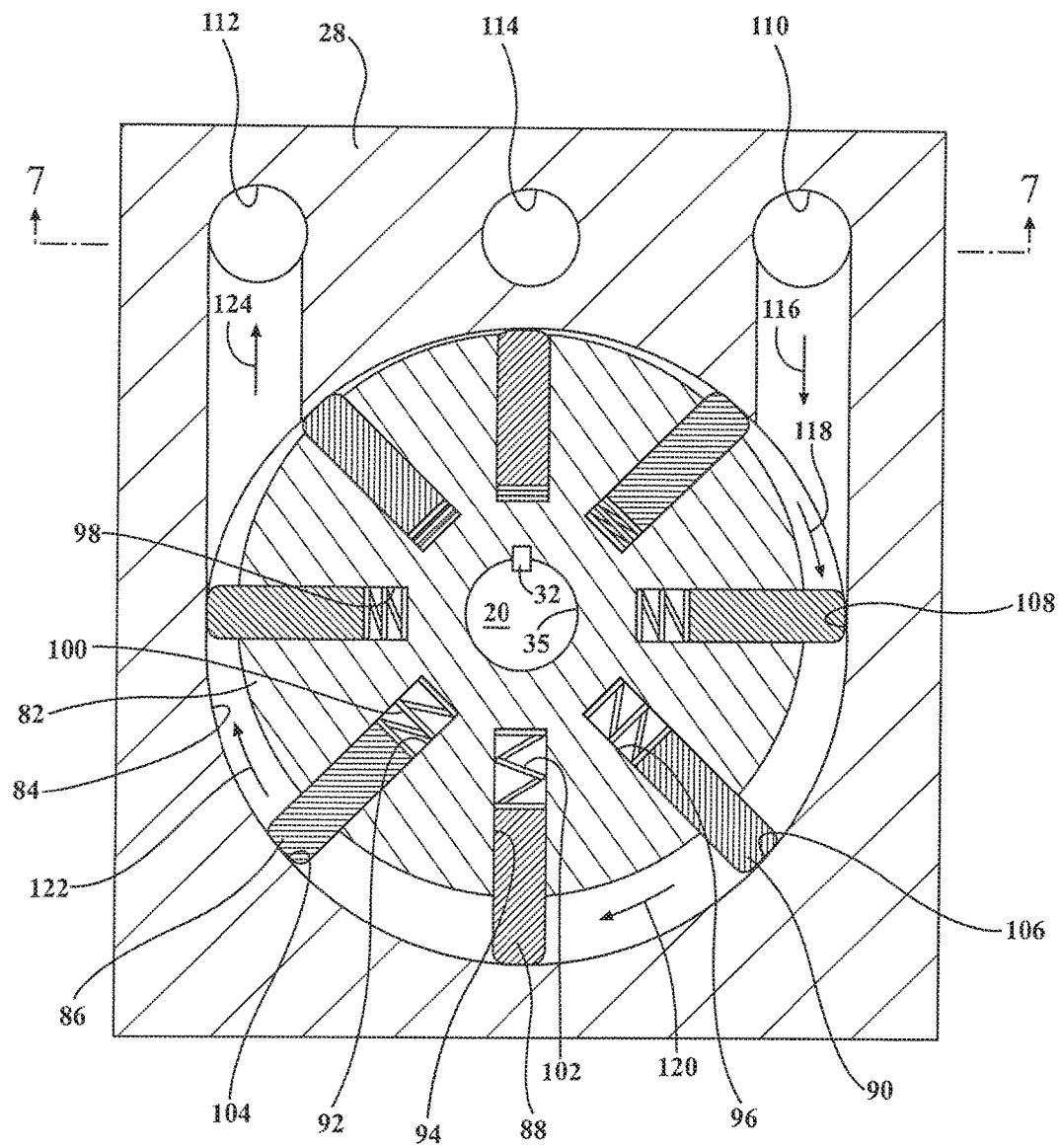
FIG. 2 is a cutaway taken along line 2-2 of FIG. 1 and illustrating a selected rotary or centrifugal driven pump contained within the input housing, such including a central drum element supported in eccentrically and fluidly driven fashion within a cylindrical interior of the pump, a plurality of outwardly biased vanes seating in circumferentially arranged pockets of the drum element and operating to convert a lower pressure inlet fluid flow into a higher pressure outlet flow for delivery to the output side housing.

Additional illustrative detail of the present system is provided in FIGS. 2-8, when viewed collectively with FIG. 1, and with the following description. FIG. 2 is a cutaway taken along line 2-2 of FIG. 1 and illustrating selected rotary or centrifugal driven pump 28 contained within the input housing 12, such including a central drum element 82 supported in eccentrically and fluidly driven fashion within a cylindrical interior of the pump, this further referenced by circular inner wall 84 which extends in a cylindrical three dimensional direction.

A plurality of outwardly biased vanes, see as referenced at 86, 88, 90, et seq., are shown and include a total of eight in the illustrated embodiment. As further shown, the vanes seat in circumferentially arranged pockets, see further at 92, 94, 96, et seq., configured in circumferentially arrayed fashion about of the drum 82.

Each of the vanes 86, 88, 90, et seq. are outwardly biased from their corresponding receiving pockets 92, 94, 96, et seq., such as via coil springs, examples of which are depicted at 98, 100, 102, et seq., mounted within the interior ends of the pockets, in order to maintain the outer end profiles of the vanes (examples of which are shown at locations 104, 106, 108 for selected vanes) in continual contact with the interior circumferential surface of the wall 84. Without limitation, other structure or components outside of those disclosed can also be incorporated into the present invention in order to influence vanes into continual sealing contact with the inner circumferential wall surface of the pump.

The manifold network for each of the input housing 12 and output housing 14 includes each of an inlet line (also passageway) 110, an outlet line (passageway) 112 and a neutral/return line (passageway) 114, for purposes of the present description these lines or passageways also being referred to first inlet, outlet and return manifolds associated with the first or input housing and second inlet, outlet and return manifolds associated with the second or output housing. This is shown in FIG. 2 in relation to the input side and by which the inlet fluid flow (see again at 76 in FIG. 7) is introduced into the selected pump (at 26 in FIG. 2 and as represented by a distributed or branched flow 116 of the general inlet flow 76), such occurring upon the associated valve being in the open position to admit fluid into the inlet of the rotary pump body.

As further shown in FIG. 2, the rotary driving action of selected pump 28, such as referenced in a clockwise direction, progressively compresses and drives the fluid, at further locations identified at 118, 120 and 122, before outputting a pressurized fluid flow at 124 (such defined as a pressure elevated above that delivered to each pump intake) for delivery to the common outlet manifold line 112. The aggregate of the (valve activated) input pumps 26, 28, 30, et seq., are then combined into the collective outlet manifold passageway 112 and communicated through the pressurized outlet line 16 for delivery to the outlet housing (or housing portion 14).

As described, the pumps 58, 60, et seq., and valves 64, 66 et seq. incorporated into the output side housing 14 operate in a reverse arrangement to the input side 12, such that either of the outlet side manifolds 110' or 112' can be employed to drive the outlet side pumps, i.e. outlet pumps will be driven in an opposite (ccw) direction as compared to input side pumps if, as shown, fluid line 116 extends directly to manifold 112' as in FIG. 7. Alternatively, the outlet line 16 from housing 12 can be modified from that shown to branch or cross over to inlet manifold 110' of the output housing 14 in order to drive the output side pumps 58, 60, et seq., in a similar (cw) as illustrated in FIG. 2.

Depending upon which of the output side manifolds 110' or 112' is communicated to the input housing (high pressure) delivery line 16, the other manifold is dormant (as depicted by manifold line 110' in housing 14 in FIGS. 7-8). After driving the activated pumps on the output side (such occurring in an identical and reverse manner to the operation of the pump as described in FIG. 2 on the input side and in order to drive the output shaft 24 and associated driven output 22), the now spent and lower pressure fluid is collected in the return line 114' for redelivery (through previously identified return line 74) either to a common reservoir 80 (such containing if desired a suitable filter) and, depending upon whether a closed circulation system, back to a return location corresponding to inlet manifold 110 of the input side housing 12.

Figure 3:
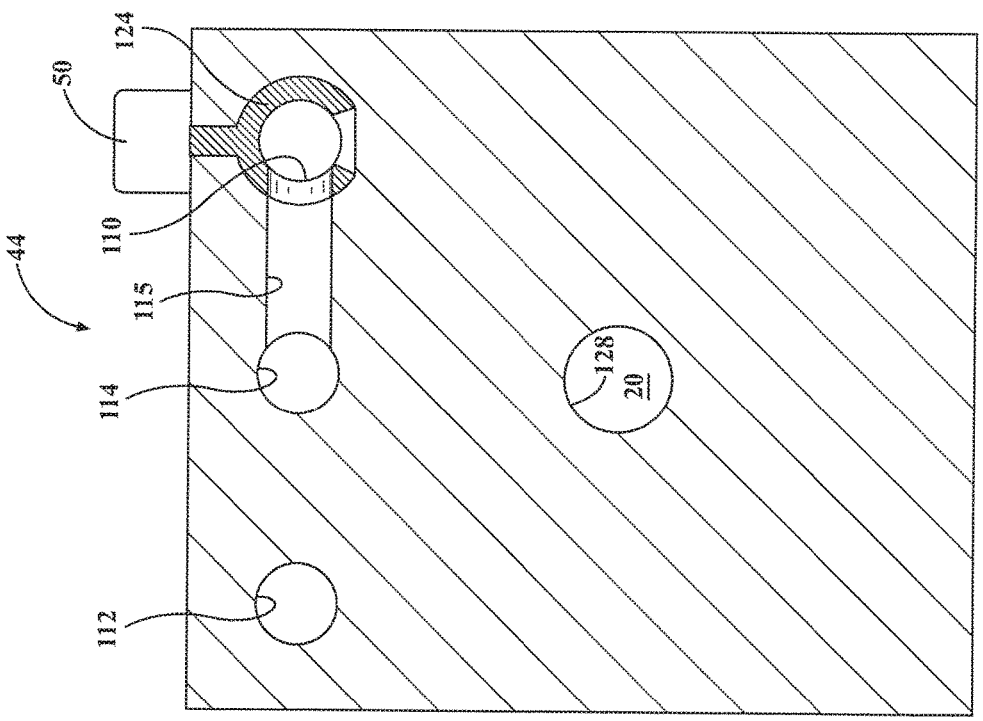
FIG. 3 is a cutaway view taken along line 3-3 of FIG. 1 and illustrating a solenoid actuated rotary valve associated with a selected rotary pump for activating or deactivating the pump.

FIG. 3 is a cutaway view taken along line 3-3 of FIG. 1 and illustrating solenoid 50 actuating a rotary valve, at 124 associated with selected valve body 44 from FIG. 1, as shown in that figure for activating or deactivating selected rotary pump 28 which is stacked with valve body 44. The valve body 44 includes a general configuration matching that of the alternating stacked plurality of pump bodies (and as exemplified by pump 28 described in FIG. 2) and includes an aligning arrangement of inlet manifold 110, outlet manifold 112, and neutral/return manifold 114.

The rotary valve 124 as shown includes a ball seat element situated within the valve body 44 at the inlet manifold location 110 and which is activated by the dedicated solenoid 50 to be rotated between open (fluid flowing) and closed (fluid interrupting) positions. For purposes of comparison, a closed or interrupted flow location is referenced in FIG. 8 for valve 54 in which flow is redirected to the neutral/return line 114 (via bypass line 115) as compared to being allowed to flow into the branched inlet of the selected rotary pump.

Figure 4:
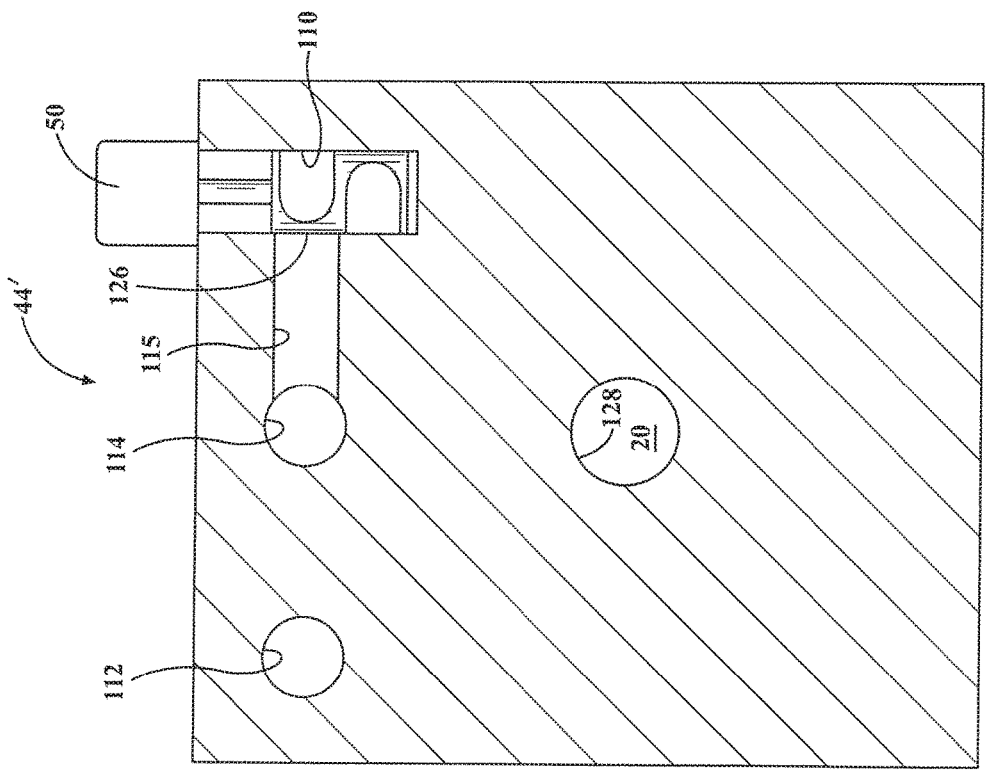
FIG. 4 is an illustration of a solenoid actuated spool valve in substitution of the rotary valve of FIG. 3.

FIG. 4 is an illustration, at 44' of a solenoid actuated spool valve 126 in substitution of the rotary valve of FIG. 3. Without limitation, the present invention contemplates any type of valve and/or solenoid structure which can be integrated into the assembly in order to selectively engage or disengage a given rotary pump according to the input/output scaled power requirements of the assembly. In the instance of each of FIGS. 3-4, a further central interior aperture 128 is shown and corresponds to receiving the shaft (input 20 or output 24) extending through either of the input or output side housings. It again is further understood that the shaft is keyed (as depicted at 32, 34, 36) to each of the alternating stacked rotary pumps for slaving the shaft 20 at a notched location, this shown at 33 formed into an interior aperture 35 in the pump body for receiving the shaft 20 for continual rotation (whether or not fluid enabled).

Figure 5:
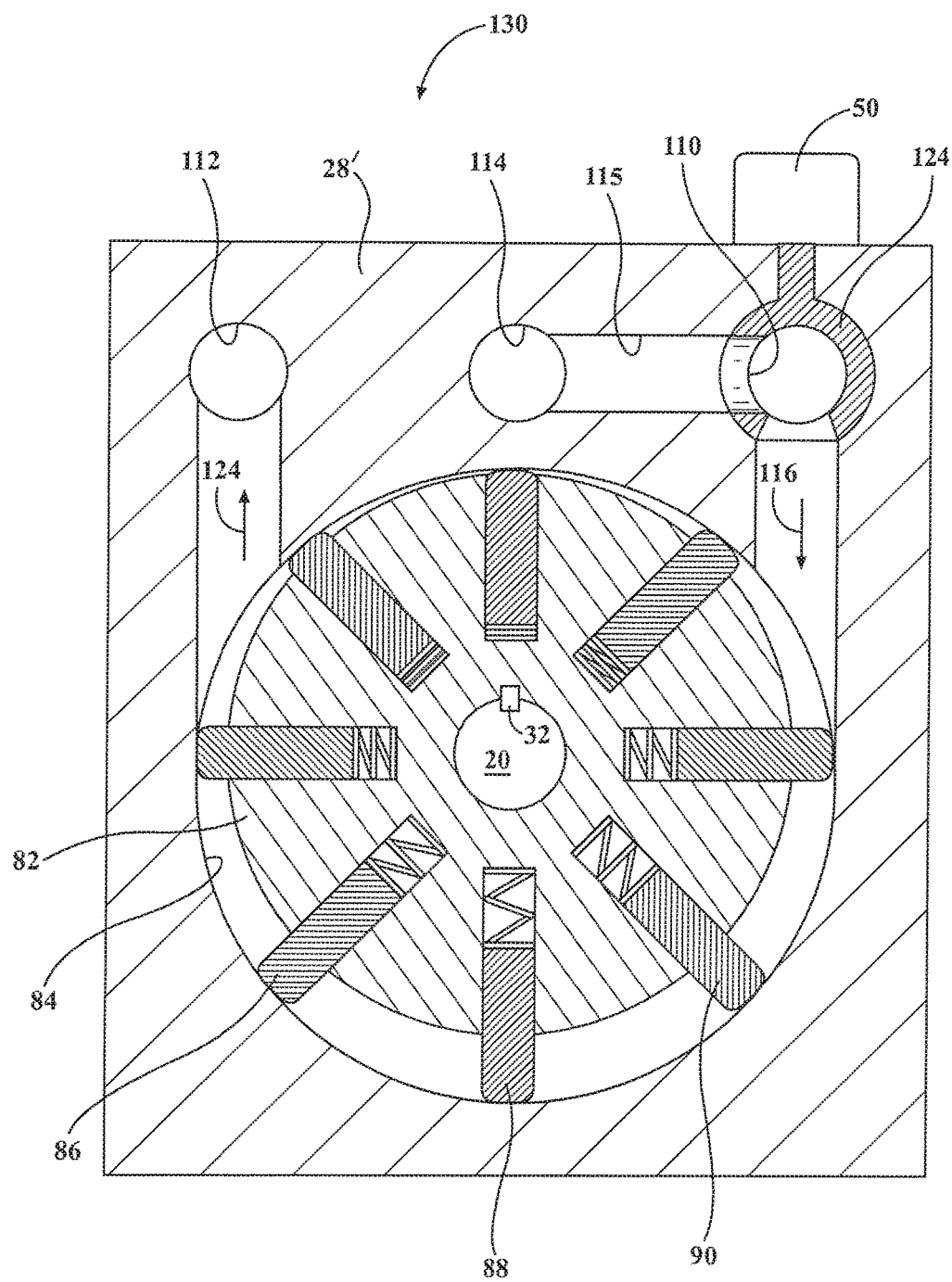
FIG. 5 is an illustration of a further variant of combined pump and valve as separately depicted in FIGS. 2-3.

With further reference to FIG. 5, an illustration is generally shown at 130 of a further variant of combined pump and valve as separately depicted in FIGS. 2-3, such being designated as modified pump body 28' which integrates the solenoid 50, valve 124 and bypass line 115 previously described. All other features of the modified/combined pump body are repeated from the description of FIG. 2 with such elements being repetitively numbered.

Figure 6:
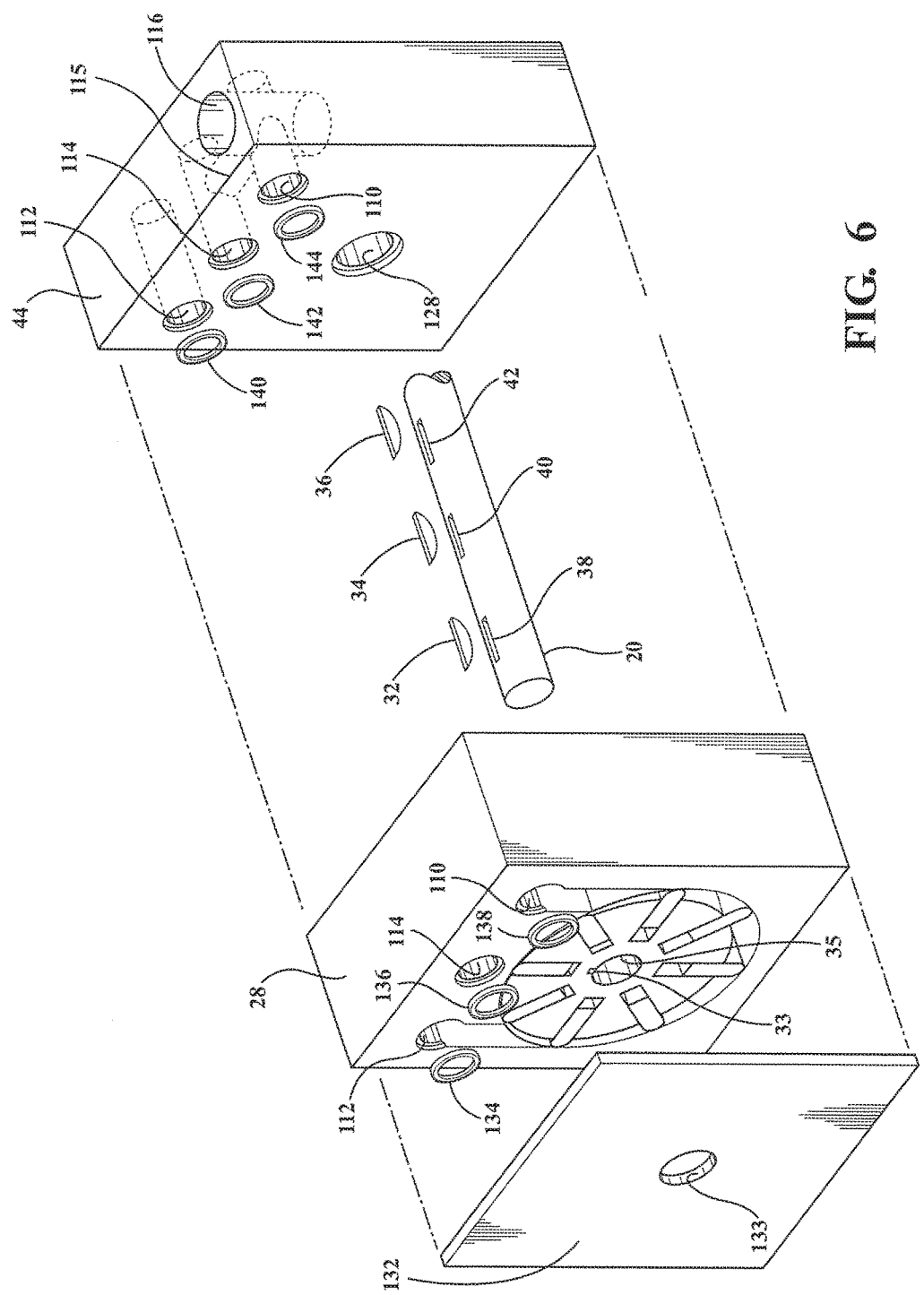
FIG. 6 is an exploded view of a selected pump (see also cutaway FIG. 2) and valve (FIG. 3) in combination with a (drive) shaft with drop in key or spline portions for slaving each of the spaced apart pumps into rotation with the shaft.

FIG. 6 is an exploded view of a selected pump (see also cutaway FIG. 2) and valve (FIG. 3) in combination with (drive) shaft 20 with drop in key or spline portions 32, 34, 36, et seq., for slaving each of the spaced apart pumps into rotation with the shaft. The features illustrated are repetitive to a large degree to that described in FIGS. 2-5, however FIG. 6 also includes additional operative components such as an enclosure lid or cover (at 132 with central shaft passage aperture 133) for sealing over the selected pump 28, in combination with circular shaped seals or gaskets, at 134, 136, and 138, for preventing leakage from each of the input or output situated pumps. An additional matching set of circular gaskets 140, 142 and 144 are provided for sealing the interface surfaces of the manifold passageways 110, 112, 114 of the valve body 44 with the adjoining passageway locations in the abutting pump 28.

FIG. 7 is a horizontal cutaway, taken along line 7-7 of FIG. 2, of the hydraulic motor according to one operating arrangement illustrating the collection and distribution manifold associated with each of the input 12 and output 14 side housings. The operational variant of FIG. 7 illustrates the valves (26, 28, and 30 on the input side and at 60 and 62 on the output side) all open and associated with activation of each of pumps 54, 52 and 50 on the input side and pumps 58 and 60 on the output side according to a 3:2 operating ratio. FIG. 8 is a similar illustration to FIG. 7 and depicting a selected input side pump closed due to bypass activation of solenoid valve body 54 in order to convert the 3:2 stacked arrangement input to output operating pumps in FIG. 7 to a 2:2 arrangement.

In operation, the pumps on the input housing 12 are all turning in response to rotation of the splined shaft and in order to create the hydraulic generated flow. The array of valve bodies and associated solenoids switch to determine a given output flow, such as up to 1000 psi in one non-limiting range, which passes through the fluid pressurized line 16 to the output housing 14, with the output likewise capable of being scaled to any number of operable pumps.

It is further envisioned that the input 12 and outlet 14 components can be joined in one overall housing (see at 146 in FIG. 8). It is further anticipated that the design of the fluid motor can be further modified to allow for efficient scaling (adding/removing) of additional stacked pump and valve subassemblies as shown in the related variants of FIGS. 2-6. In one application, the present invention envisions that a comparable sized hydraulic motor to an AC induction motor will produce a greater power output.

Additional aspects of the system, beyond its scalability, further include enabling or adapting its hydraulic and/or fluid drive system to adapt to any transfer motive environment for mechanical devices, machines, and vehicles utilized in any one or more of land, water, air or space applications. As previously described, scalability is facilitated by grouping the pumps in varying combinations on both the input and output sides of the overall assembly, along with the use of the volume ratio controls (again via the configuration of the solenoids/spool valves and common manifolds), and, in this fashion, the fluid drive system utilizes the fluid volume ratios to adjust torque and rpm on both the input (housing 12) and output (housing 14) sides.

Without limitation, both the input 12 and output 14 housings can be constructed in modular fashion with removable ends and fittings, such as which enable any number of identically configured pump subsections to be plural arranged (such as including but not limited to in an end-to-end manner) in order to calibrate both the input and output capabilities of the system. This can include input to output side volumetric ratios of 2-3:1, 5:2, 7:3, etc. To this end, the present invention also contemplates the ability to swap such subsections between the input and output sides of the engine.

Additional features of the assembly include simplified braking and traction control, the incorporation of a wide range of different materials used in construction, including such as aluminum, steel or composites. The present design further allows for unrestricted placement of the drive housing or modules, with the present system resulting in weight reductions of a typical vehicle drive system. The scalability aspect of the present system also exponentially expands the possible combinations of gear ratios in such a vehicle drive system, such at present being limited by complexity, weight and size.

Having described my invention, other and additional preferred embodiments will become apparent to those skilled in the art to which it pertains, and without deviating from the scope of the appended claims.

I claim:

1. A hydraulic motor, comprising:
an input housing containing a first plurality of stacked and individual centrifugally driven pumps, said pumps interconnected by each of first inlet, outlet and return manifolds extending through said input housing;
an output housing containing at least one of a second plurality of stacked and individual centrifugally driven pumps interconnected by each of second inlet, outlet and return manifolds extending through said output housing;
a drive shaft in communication with a separate work input extending through said input housing in communication with said first plurality of pumps, rotation of said input drive shaft driving said first pumps to pressurize a fluid flow introduced from said first inlet manifold and to combine the pressurized fluid flow into said first outlet manifold;
a pressure resistant conduit extending from said first outlet manifold for delivery of the pressurized fluid flow to said second inlet manifold of said output housing for driving said second pumps; and
a driven shaft in communication with a separate work output extending through said output housing in communication with said second plurality of pumps which, upon being rotated by the pressurized fluid driving of said second pumps, drives the work output.

2. The hydraulic motor of claim 1, further comprising first and second pluralities of valves integrated into each of said input and output housings in communication with an intake location of a selected one of each of said first and second pluralities of pumps, said valves being actuated to selectively activate or deactivate each of said pumps.

3. The hydraulic motor of claim 2, further comprising a bypass extending from said intake location of each of said first and second pluralities of pumps and communicating to said first or second return manifolds for redirecting fluid flow within said inlet manifolds of either of said input and output housings, and upon deactivation of said selected pump by said valve.

4. The hydraulic motor of claim 1, further comprising a return line extending from said second outlet manifold to said first inlet manifold.

5. The hydraulic motor of claim 4, further comprising a fluid collection reservoir in said return line.

6. The hydraulic motor of claim 2, further comprising first and second pluralities of electromagnetic actuated solenoids integrated into each of said first and second pluralities of valves for actuating said first and second pumps associated with both said power input and output housings.

7. The hydraulic motor of claim 2, each of said first and second pluralities of valves further comprising a rotary valve.

8. The hydraulic motor of claim 2, each of said first and second pluralities of valves further comprising a spool valve.

9. The hydraulic motor of claim 2, each of said first and second pluralities of valves further comprising a body in alternating stacked arrangement with each of said first and second pluralities of pumps.

10. The hydraulic motor of claim 1, further comprising first and second pluralities spline portions extending from each of said input housing drive shaft and said output housing driven shaft for slaving rotation of said first and second pluralities of pumps.

11. The hydraulic motor of claim 1, each of said first and second pluralities of centrifugal pumps further comprising:
a central drum supported in eccentrically and fluidly driven fashion within a cylindrical interior of a body of said pump;
a plurality of outwardly biased vanes seat in circumferentially arranged pockets configured in circumferentially arrayed fashion about said drum;
each of said vanes outwardly biased from their corresponding receiving pockets in order to maintain outer end profiles of the vanes in continual contact with an opposing and interior circumferential surface of said pump body interior.

12. The hydraulic motor of claim 11, further comprising springs supported within each of said circumferentially arrayed pockets for biasing against inner ends of said vanes.

13. The hydraulic motor as described in claim 1, further comprising a rotary driving direction of each of said first and second pluralities of centrifugally driven pumps being both reversible and bi-directional.

14. The hydraulic motor as described in claim 1, further comprising said input and output housings each being scalable in order to vary a volumetric ratio between said first and second pluralities of centrifugally driven pumps.

15. The hydraulic motor as described in claim 1, further comprising said input and output housings being integrated into a unitary body.

16. A hydraulic motor, comprising:
an input housing containing a first plurality of stacked and individual centrifugally driven pumps, said pumps interconnected by each of first inlet, outlet and return manifolds extending through said input housing;
an output housing containing at least one of a second plurality of stacked and individual centrifugally driven pumps interconnected by each of second inlet, outlet and return manifolds extending through said output housing;
a drive shaft in communication with a separate work input extending through said input housing in communication with said first plurality of pumps, rotation of said input drive shaft driving said first pumps to pressurize a fluid flow introduced from said first inlet manifold and to combine the pressurized fluid flow into said first outlet manifold;

a pressure resistant conduit extending from said first outlet manifold for delivery of the pressurized fluid flow to said second inlet manifold of said output housing for driving said second pumps;

a driven shaft in communication with a separate work output extending through said output housing in communication with said second plurality of pumps which, upon being rotated by the pressurized fluid driving of said second pumps, drives the work output;

first and second pluralities of valves integrated into each of said input and output housings in communication with an intake location of a selected one of each of said first and second pluralities of pumps, said valves being actuated to selectively activate or deactivate each of said pumps;

first and second pluralities of electromagnetic actuated solenoids integrated into each of said first and second pluralities of valves for actuating said first and second pumps associated with both said power input and output housings;

a bypass extending from said intake location of each of said first and second pluralities of pumps and communicating to said first or second return manifolds for redirecting fluid flow within said inlet manifolds of either of said input and output housings, and upon deactivation of said selected pump by said valve; and a return line extending from said second outlet manifold to said first inlet manifold, a fluid collection reservoir in said return line.

17. The hydraulic motor of claim 16, further comprising first and second pluralities spline portions extending from each of said input housing drive shaft and said output housing driven shaft for slaving rotation of said first and second pluralities of pumps.

18. The hydraulic motor of claim 16, each of said first and second pluralities of centrifugal pumps further comprising:
a central drum supported in eccentrically and fluidly driven fashion within a cylindrical interior of a body of said pump;
a plurality of outwardly biased vanes seat in circumferentially arranged pockets configured in circumferentially arrayed fashion about said drum;
each of said vanes outwardly biased from their corresponding receiving pockets in order to maintain outer end profiles of the vanes in continual contact with an opposing and interior circumferential surface of said pump body interior.

19. A hydraulic motor, comprising:
an input housing containing a first plurality of stacked and individual centrifugally driven pumps, said pumps interconnected by each of first inlet, outlet and return manifolds extending through said input housing;
an output housing containing at least one of a second plurality of stacked and individual centrifugally driven pumps interconnected by each of second inlet, outlet and return manifolds extending through said output housing;
each of said first and second pluralities of centrifugal pumps further comprising:
a central drum supported in eccentrically and fluidly driven fashion within a cylindrical interior of a body of said pump;
a plurality of outwardly biased vanes seat in circumferentially arranged pockets configured in circumferentially arrayed fashion about said drum; and
each of said vanes outwardly biased from their corresponding receiving pockets in order to maintain outer end profiles of the vanes in continual contact with an opposing and interior circumferential surface of said pump body interior;
a drive shaft in communication with a separate work input extending through said input housing in communication with said first plurality of pumps, rotation of said input drive shaft driving said first pumps to pressurize a fluid flow introduced from said first inlet manifold and to combine the pressurized fluid flow into said first outlet manifold;
a pressure resistant conduit extending from said first outlet manifold for delivery of the pressurized fluid flow to said second inlet manifold of said output housing for driving said second pumps;
a driven shaft in communication with a separate work output extending through said output housing in communication with said second plurality of pumps which, upon being rotated by the pressurized fluid driving of said second pumps, drives the work output;
first and second pluralities of valves integrated into each of said input and output housings in communication with an intake location of a selected one of each of said first and second pluralities of pumps, said valves being actuated to selectively activate or deactivate each of said pumps;
first and second pluralities of electromagnetic actuated solenoids integrated into each of said first and second pluralities of valves for actuating said first and second pumps associated with both said power input and output housings.

20. The hydraulic motor of claim 19, further comprising a bypass extending from said intake location of each of said first and second pluralities of pumps and communicating to said first or second return manifolds for redirecting fluid flow within said inlet manifolds of either of said input and output housings, and upon deactivation of said selected pump by said valve.

* * * * *